United States Patent
Churchill et al.

(10) Patent No.: US 10,436,878 B2
(45) Date of Patent: Oct. 8, 2019

(54) LOCALISING PORTABLE APPARATUS

(71) Applicant: THE CHANCELLOR MASTERS AND SCHOLARS OF THE UNIVERSITY OF OXFORD, Oxford, Oxfordshire (GB)

(72) Inventors: Winston Samuel Churchill, Oxford (GB); Paul Michael Newman, Oxford (GB); Christopher James Linegar, Oxford (GB)

(73) Assignee: The Chancellor Masters and Scholars of The University of Oxford (GB)

( * ) Notice: Subject to any disclaimer, the term of this patent is extended or adjusted under 35 U.S.C. 154(b) by 180 days.

(21) Appl. No.: 15/536,216

(22) PCT Filed: Dec. 4, 2015

(86) PCT No.: PCT/GB2015/053723
§ 371 (c)(1),
(2) Date: Jun. 15, 2017

(87) PCT Pub. No.: WO2016/097690
PCT Pub. Date: Jun. 23, 2016

(65) Prior Publication Data
US 2017/0343643 A1    Nov. 30, 2017

(30) Foreign Application Priority Data
Dec. 15, 2014  (GB) .................................. 1422262.4

(51) Int. Cl.
*G01C 21/34* (2006.01)
*G01S 5/16* (2006.01)
(Continued)

(52) U.S. Cl.
CPC ............... *G01S 5/16* (2013.01); *G01C 21/28* (2013.01); *G01C 21/30* (2013.01);
(Continued)

(58) Field of Classification Search
None
See application file for complete search history.

(56) References Cited

U.S. PATENT DOCUMENTS 8,718,932 B1    5/2014   Pack et al.
2002/0001398 A1*  1/2002   Shimano ............. G06K 9/6293
                                                 382/104
(Continued)

FOREIGN PATENT DOCUMENTS

WO    2013117940 A2    8/2013
WO    2013140133 A1    9/2013
WO    2016097690 A1    6/2016

OTHER PUBLICATIONS

Bishop, "Intelligent Vehicle Technology and Trends", 2005, Artech House, Inc., p. 225-231 (Year: 2005).*
(Continued)

*Primary Examiner* — Tamara L Weber
(74) *Attorney, Agent, or Firm* — Finch & Maloney PLLC

(57) ABSTRACT

A method of localizing portable apparatus (200) obtains: a stored experience data set comprising a set of connected nodes; captured location representation data provided by at least one sensor associated with the portable apparatus, and a current pose estimate of the portable apparatus within the environment. The pose estimate is used to select a candidate set of the nodes that contain a potential match for the captured location representation data. The pose estimate is used to obtain a set of paths from path memory data, each said path comprising a set of said nodes previously traversed in the environment under similar environmental/visual conditions. The set of paths is used to refine the candidate set. The captured location representation data and the refined candidate set of nodes is compared in order to identify a current pose of the portable apparatus within the environment.

20 Claims, 7 Drawing Sheets

(51) Int. Cl.
*G01C 21/28* (2006.01)
*G05D 1/02* (2006.01)
*G01C 21/36* (2006.01)
*G06T 7/73* (2017.01)
*G01C 21/30* (2006.01)
*H04N 7/18* (2006.01)

(52) U.S. Cl.
CPC ....... *G01C 21/3602* (2013.01); *G05D 1/0246* (2013.01); *G06T 7/74* (2017.01); *H04N 7/18* (2013.01); *G05D 2201/0213* (2013.01); *G06T 2207/30252* (2013.01)

(56) References Cited

U.S. PATENT DOCUMENTS

2014/0201266 A1* 7/2014 Jackson ............... G08G 1/0175 709/203
2017/0205832 A1* 7/2017 Iimura .................. G01B 11/00

OTHER PUBLICATIONS

International Search Report and Written Opinion received for Patent Application No. PCT/GB2015/053723, dated Mar. 4, 2016. 11 pages.
GB Intellectual Property Office Search Report under Section 17(5) received for GB Patent Application No. 1422262.4 dated Jun. 9, 2015. 3 pages.
Churchill, W., Newman, P., "Experience-based navigation for long-term localisation," The International Journal of Robotics Research, 2013; vol. 32. pp. 1645-1661.
Fraundorfer, et. al., "Topological mapping, localization and navigation using image collections," Proceedings of the 2007 IEEE/RSJ International Conference on Intelligent Robots and Systems. Oct. 29-Nov. 2, 2007. pp. 3872-3877.
International Preliminary Report on Patentability received for Patent Application No. PCT/GB2015/053723, dated Jun. 29, 2017. 9 pages.

* cited by examiner

Prior

Likelihood

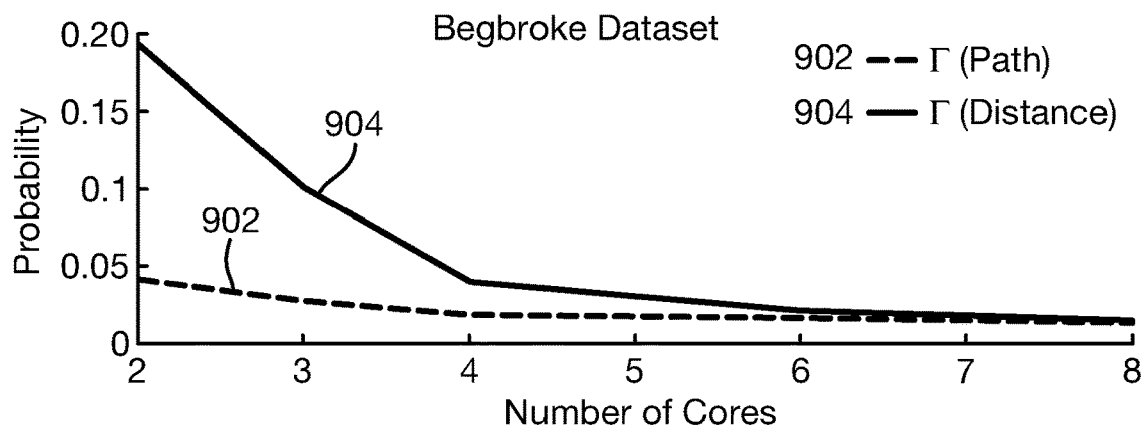
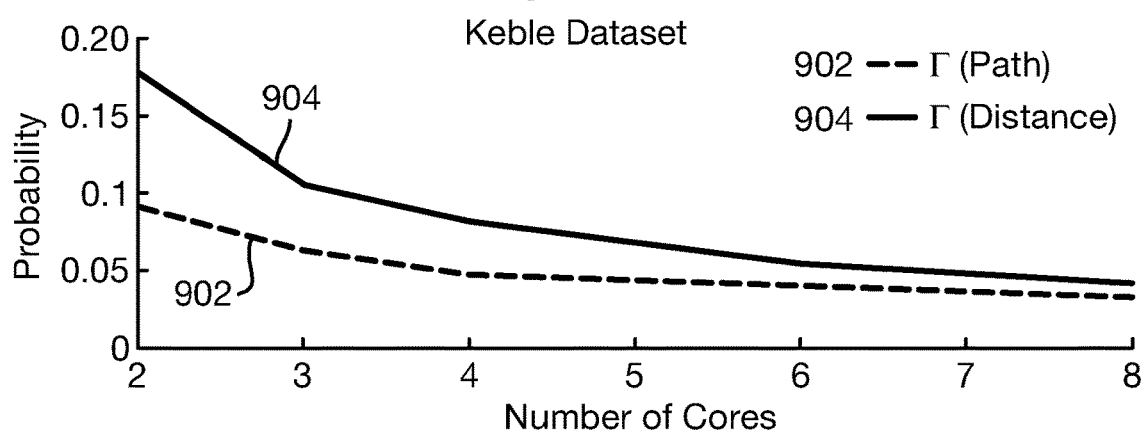
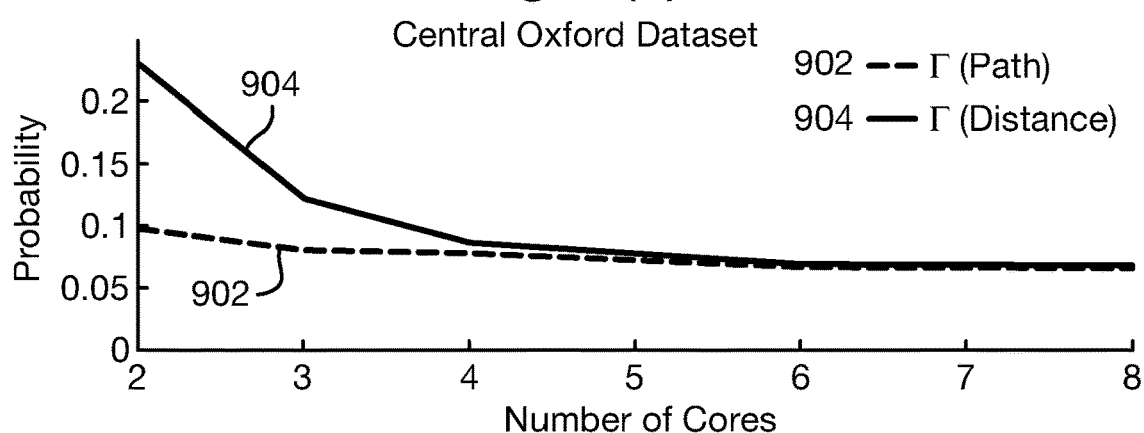

Probability of Distance Travelled using Dead Reckoning

1001 —— $\Gamma$ (Distance), $N_p = 2$
1002 — — $\Gamma$ (Distance), $N_p = 4$
1003 —— $\Gamma$ (Path), $N_p = 2$
1004 - - - $\Gamma$ (Path), $N_p = 4$ 111 —— $\Gamma$ (Path), $N_p = 2$
112 — — $\Gamma$ (Path), $N_p = 4$

LOCALISING PORTABLE APPARATUS

The present invention relates to mapping and localising portable apparatus within an environment.

Experience-based Navigation (EBN) has been demonstrated as a robust method for localising portable apparatus, such as a robot or autonomous vehicle, in challenging environments (see W. Churchill and P. Newman, "Experience-based navigation for long term localisation," The International Journal of Robotics Research, vol. 32, no. 14, pp. 1645-1661, 2013). In EBN a system continually grows and curates a visual map of the world that explicitly supports multiple representations of the same place, thus capturing the full spectrum of change in the environment. These representations are generally known as "experiences", where a single experience captures the appearance of an environment under certain conditions, much like a snapshot. Thus, an experience can be thought of as a visual memory. In alternative implementations, non-visual representations of experiences generated using other types of sensors can be used.

By accumulating experiences it is possible to handle cyclic appearance change (diurnal lighting, seasonal changes, and extreme weather conditions) and also adapt to slow structural change. This strategy, although elegant and effective, poses a new challenge: in a region with many stored representations, which one(s) should be used to try to localise against given finite computational resources?

Appearance change poses a significant challenge to outdoor visual localisation. FIGS. 1(a)-1(c) illustrate how images of three locations in an environment captured at different times under different conditions can change. Such environments which exhibit multiple appearances may need many overlapping experiences to capture the full spectrum of change. At run-time, the portable apparatus recalls the neighbouring visual memories/experiences for localisation. Whilst this approach has been shown to provide significant robustness to appearance change, it is computationally demanding. As experience density increases, the portable apparatus must do more work in order to obtain a successful localisation. This can result in a navigation system which becomes less efficient as more experiences are added to the map, and poses a problem for resource-constrained systems. Apparatus with limited computational resources cannot keep up with the additional work load, resulting in localisation performance which degrades over time. This places an unacceptable limit on the ability of the apparatus to navigate in a changing environment.

Much of the prior work on improving localisation in a map of experiences has focused on permanently deleting experiences to maintain on-line performance.

Embodiments of the present invention are intended to address at least some of the problems identified above and can provide improved life-long, vast-scale localisation despite changes in weather, lighting and scene structure. Embodiments can enable portable apparatus (or a control system for portable apparatus) to predict which visual memory will be relevant to the live camera image, greatly increasing computational efficiency and enabling life-long navigation on robots with finite computational resources.

Embodiments of the present invention can learn from the previous use of the experience map and make predictions about which memories should be considered next, conditioned on where the portable apparatus is currently localised in the experience-map. During localisation, the loading of past experiences can be prioritised in order to minimise the expected computation required. This can be done in a probabilistic way such that this memory policy significantly improves localisation efficiency, enabling long-term autonomy on portable apparatus with limited computational resources.

Embodiments can capture the past use of the experience-map in a "path memory". This new concept can provide a way to encode the localisation history of the apparatus into the map representation. Path memory can comprise a collection of paths, where each path links experiences used by the apparatus during localisation on a particular outing. These paths can implicitly link relevant experiences together; for example, an experience-map may contain sunny and rainy experiences. Without knowledge of the underlying causes of the appearance change (in this case weather), paths link the sunny experiences together, and the rainy experiences together. Path memory can be used as training data to make predictions about which experiences will be relevant—this can make the learning process unsupervised and may continually improve.

Embodiments approach the problem of computational efficiency in a different manner to conventional approaches. A deletion policy for outdoor environments would need to distinguish between experiences that are outdated, and those only temporarily not relevant. For example, is it desirable to delete all the map's rainy experiences simply because it has not rained for the past two weeks? But what if the experience density is still too high after pruning? To delete more experiences would reduce the diversity of the map representation. Instead, embodiments provide a technique for recalling experiences which are relevant to the live camera image. This can make it possible to maintain a much larger number of experiences in the map, while only localise in a small subset of these during localisation.

According to one aspect of the present invention there is provided a method of localising portable apparatus in an environment, the method comprising:

obtaining a stored experience data set comprising a set of connected nodes, each said node comprising a representation of a location within the environment;

obtaining captured location representation data provided by at least one sensor associated with the portable apparatus;

obtaining a current pose estimate of the portable apparatus within the environment;

using the current pose estimate to select a candidate set of the nodes from the stored experience data set that contain a potential match for the captured location representation data;

using the current pose estimate to obtain a set of paths from path memory data, each said path comprising a set of said nodes previously traversed in the environment under similar environmental/visual conditions;

using the set of paths to refine the candidate set of nodes, and comparing the captured location representation data and the refined candidate set of nodes in order to identify a current pose of the portable apparatus within the environment.

The step of using the set of paths to refine the candidate set of nodes may comprise:

assessing if the current pose estimate corresponds to a said node in a said path in the set of paths, and if a result of the assessing is positive then selecting the corresponding node in that path for inclusion in the refined set of candidate nodes.

The step of using the set of paths to refine the candidate set of nodes may comprise:

determining if the nodes traversed by the portable apparatus prior to the node corresponding to the current pose estimate correspond to said nodes in a said path, and if a result of the determination is positive then at least one neighbouring said node in the path is selected for inclusion in the refined candidate set.

The step of using the current pose estimate to select the candidate set of nodes may include selecting an initial set of candidate nodes that are neighbours the current pose estimate. The selecting of the initial set of nodes may comprise ranking the neighbouring nodes according to distance from the current pose estimate.

The step of using the set of paths to refine the candidate set of nodes can comprise:

counting a number of said paths in the set of paths that connect a node corresponding to the current pose estimate with each said node in the candidate set, and selecting the nodes for retention in the refined candidate set based on a result of the counting.

Typically, the nodes that neighbour the node corresponding to the current pose estimate in the path(s) having the highest count will be retained.

The method may further comprise:

obtaining previous localisation data which indicates whether or not at least some of the nodes in the candidate set were processed in a previous localisation attempt, and using the previous localisation data to produce the refined set of candidate nodes.

The step of using the previous localisation data to produce the refined set of candidate nodes may comprise:

counting a number of nodes common between a said path in the path memory and the previous localisation data;

selecting the node(s) corresponding to a highest said count(s) for inclusion in the refined set of candidate nodes.

A probability distribution relating to the previous localisation data may be used to produce the refined set of candidate nodes.

The step of comparing the captured location representation data and the candidate set of nodes in order to identify a current pose of the portable apparatus within the environment can be performed in parallel by multiple CPU cores, e.g. comparing the captured image with data in four nodes of the refined candidate set can be performed in parallel by four CPU cores.

The nodes in the stored experience data set can include image data relating to 3D visual landmarks. The captured location representation data may comprise at least one visual image.

According to another aspect of the present invention there is provided device adapted to localise portable apparatus in an environment, the device comprising:

a component configured to obtain a stored experience data set comprising a set of connected nodes, each said node comprising a representation of a location within the environment;

a component configured to obtain captured location representation data provided by at least one sensor associated with the portable apparatus;

a component configured to obtain a current pose estimate of the portable apparatus within the environment;

a component configured to use the current pose estimate to select a candidate set of the nodes from the stored experience data set that contain a potential match for the captured location representation data;

a component configured to use the current pose estimate to obtain a set of paths from path memory data, each said path comprising a set of said nodes previously traversed in the environment under similar environmental/visual conditions;

a component configured to use the set of paths to refine the candidate set of nodes, and a component configured to compare the captured location representation data and the refined candidate set of nodes in order to identify a current pose of the portable apparatus within the environment.

The component configured to compare the captured location representation data may comprise plurality of processors configured to operate in parallel, each said processor configured to compare the captured location representation data with a particular one of the nodes in the refined candidate set.

According to a general aspect of the present invention there is provided a mapping/localisation method comprising:

obtaining a stored experience data set comprising a set of connected nodes, each said node comprising a representation of a location within an environment;

obtaining path memory data comprising at least one path including a set of said nodes previously traversed in the environment under similar environmental/visual conditions, and using the path memory data to select a set of nodes from the stored experienced data set to be used for mapping/localisation.

BRIEF DESCRIPTION OF THE FIGURES

For a better understanding of the invention, and to show how embodiments of the same may be carried into effect, reference will now be made, by way of example, to the accompanying diagrammatic drawings in which:

FIGS. 9(a)-9(c) are graphs related to an experiment performed using an embodiment;

DETAILED DESCRIPTION OF THE FIGURES

Some EBN fundamentals will first be discussed. Relevant material can also be found in the "Experience-based navigation for long term localisation" paper referenced above, as well as International Patent Application WO2013/140133, the contents of which are hereby incorporated by reference.

Implementations of the methods described herein can make extensive use of visual odometry. Visual odometry is used to estimate the motion/trajectory of the apparatus through the world, and to estimate the transformation between the apparatus and a prior experience that has been saved. Embodiments that employ visual odometry can operate on a stereo image pair to produce a stereo frame $F_q$ containing a set of observed 3D landmarks, where each landmark is defined relative to the co-ordinate frame of camera. To estimate the trajectory of the apparatus, visual odometry acts on the frame $F_q$ and the previous frame $F_{q-1}$. During localisation, $F_q$ is matched against the 3D landmarks contained in one of the experiences in the map. It will be understood that alternative methods of estimating the trajectory of the apparatus could be used, e.g. use of wheel odometry or an Inertial Measurement Unit.

Figure 1A:
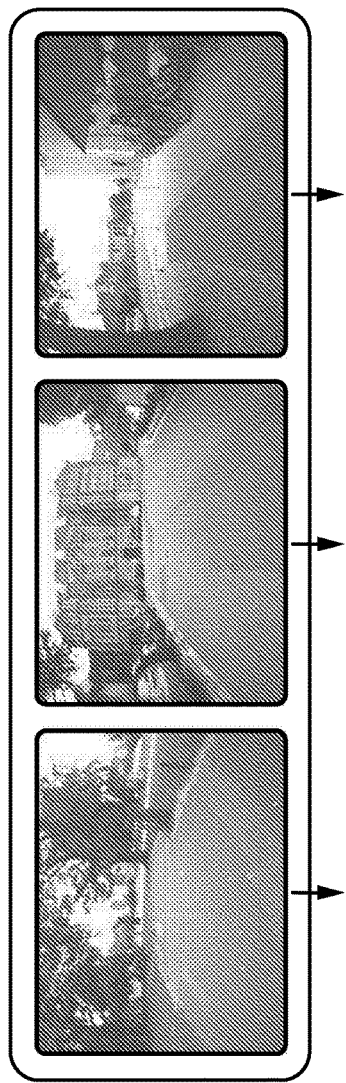
FIGS. 1(a)-1(c) are images that illustrates examples of visual changes to an environment.
Figure 1B:
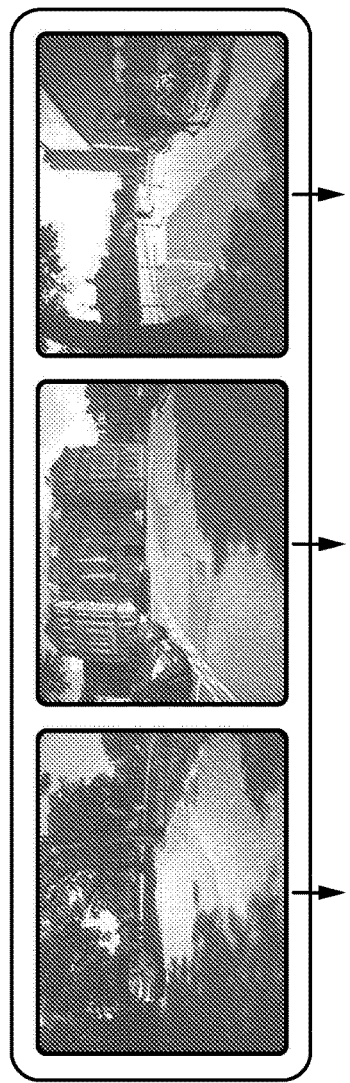
Figure 1C:
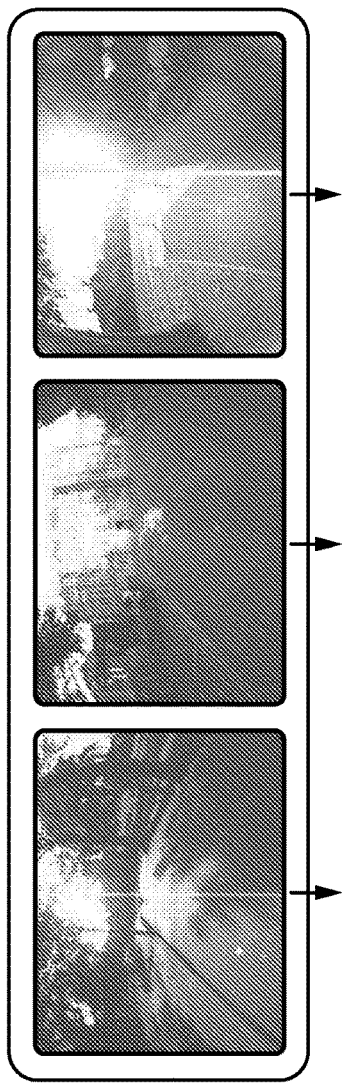
Figure 2:
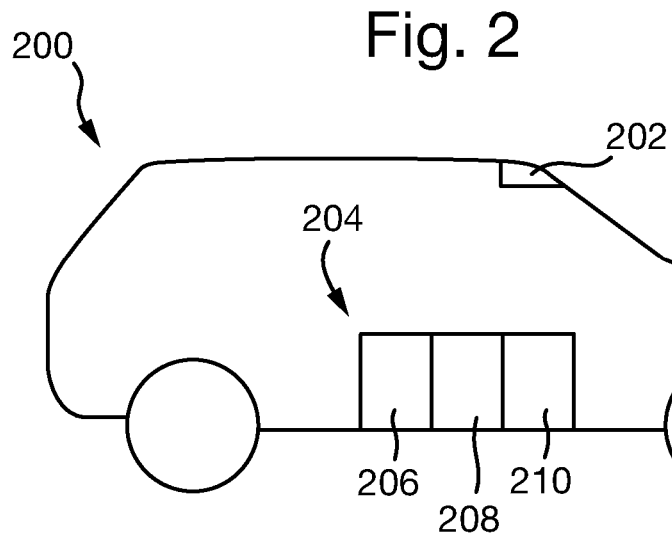
FIG. 2 is a schematic illustration of portable apparatus within an environment.

FIG. 2 illustrates schematically portable apparatus in the form of a vehicle 200 that is fitted with various sensors/imaging devices. In the particular example, the vehicle includes at least one device for capturing live images. The illustrated example vehicle includes a forwards-facing BumblebeeXB3 stereo camera 202 mounted above the driver's windshield. It will be understood that the type, number and/or arrangement of sensors can vary. For instance, any video or still (stereo or monocular) camera could be used. The image data need not necessarily be conventional (colour, monochrome or grey-scale) images generated in day/ambient light. For example, alternative embodiments can use additional light-sources or flashes, the images could be infra-red images, hyper-spectral imagery, etc. Further, non-visual sensors could be used instead of cameras, e.g. LIDAR or radar, with localisation being performed using scan-matching.

Although the example vehicle 200 is a land-based vehicle travelling along a road/ground surface, it will be appreciated that in alternative embodiments, the vehicle could be any type of vehicle (including air and water-based vehicles) that may be travelling through any kind of conventional indoor/outdoor environment. Further, in other embodiments, the camera(s) and the computing device need not be fitted to/on a vehicle, but could be included in at least one remote device, e.g. a hand-held navigation device. In some cases, some of the devices may be separate (or separable) from each other. For instance, a camera may not be directly connected to/in the same housing as a processor that performs localisation, e.g. a separate camera device held by a user may be used to provide image data that is transferred to another processing device.

The vehicle 200 travels along a surface and the camera(s) 202 captures visual image frames of the territory around the vehicle, including the surface and any surrounding objects or landmarks. The image frames, typically indexed by time frames, can be transferred to an on board (or in alternative embodiments, remote) control system/computing device 204 and may be at least temporarily stored there. The computing device 204 typically includes a processor 206, memory 208 and (wired or wireless) interface(s) 210 that allows it to communicate with the camera 202 and/or remote computing devices (not shown). The image frames can be used to create data representing an experience data set. The memory can also include data representing previously captured experiences, as well and an application configured to process experience data in order preform localisation as described herein. In alternative embodiments the image data may be transferred directly from the vehicle/camera to a remote computing device for localisation processing, with that remote device transferring the resulting data to a control system of the vehicle in order to manoeuvre it.

Figure 3:
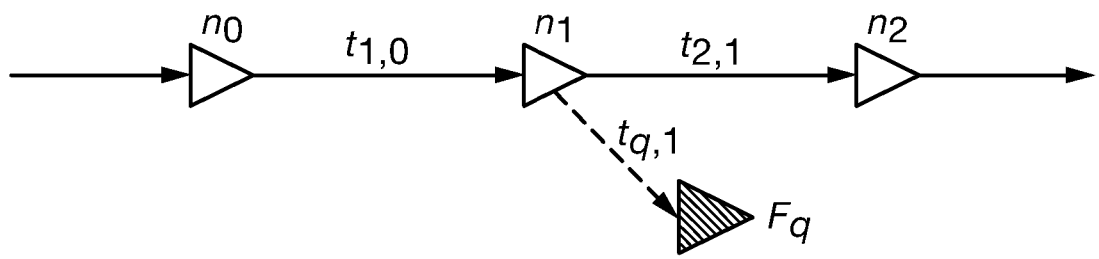
FIG. 3 shows an example experience graph based on data usable to localise the portable apparatus within the environment.

The experience-map can be stored in a graph structure, referred to as the experience graph G. The graph consists of edges and nodes, where nodes contain 3D landmarks extracted by visual odometry, and edges contain six degree of freedom transformations between nodes. A simple experience graph G is shown in FIG. 3, where the apparatus (with live stereo frame $F_q$) has a position in the graph specified by a reference node $n_k=n_1$, and a six degree of freedom transformation representing the apparatus's pose in the node's coordinate frame $t_{q,k}=t_{q,1}$. In the example embodiment each node contains a single image of the environment captured under particular visual/environmental conditions. There may be many overlapping nodes associated with a particular location or environment.

The graph structure forms a topometric map, where over short distances a metric assumption holds, but over large distances only topological connectivity is assumed. Additionally, the topometric map could be optimized for global metric accuracy; however, it is not required for EBN.

Localisation can be achieved by obtaining a stereo match between the live frame $F_q$ and a node $n_k$ in the experience graph G, using an image matching technique or by using visual odometry to determine the transformation between a node/image in the map and the live image from the camera. Localisation can begin by querying the experience graph for all neighbouring nodes. These are referred to as the set of candidate nodes Y, and they represent the possible nodes in which the apparatus may localise. The $i^{th}$ candidate node is referred to as $^iY$. The number of candidate nodes |Y| grows with the number of overlapping experiences in an area. Given finite computational resources, it may only be possible to able to attempt to localise in a small number of these experiences before being forced to abort the localiser to maintain constant processing time.

To increase/maximise the chances of obtaining a successful localisation with a limited number of localisation attempts, a ranking policy, r, orders the candidate nodes by their likelihood of obtaining a successful localisation with the live stereo image. A simple ranking policy is r(distance), which ranks candidate nodes according to their distance from the position of the apparatus.

Figure 4:
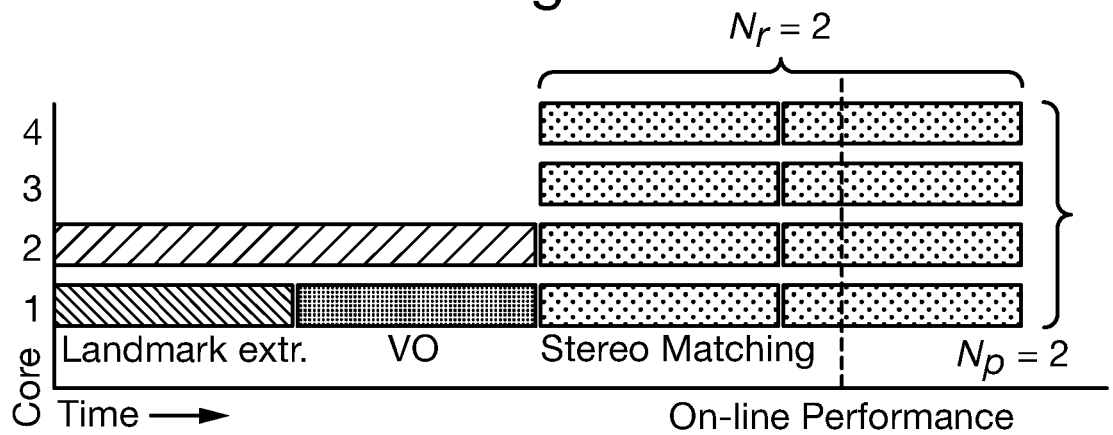
FIG. 4 is a graph illustrating a typical iteration during a localisation process.

FIG. 4 illustrates the pipeline for localisation, showing the parameters which control the number of matches that can be performed. This graph demonstrates a typical iteration during the localisation phase. A stereo image pair is obtained from the camera. Features can identified using a FAST corner detector (see M. Trajkovic and M. Hedley, "Fast corner detection," Image and vision computing, vol. 16, no. 2, pp. 75-87, 1998) and BRIEF descriptor (see M. Calonder, V. Lepetit, M. Ozuysal, T. Trzcinski, C. Strecha, and P. Fua, "Brief: Computing a local binary descriptor very fast," Pattern Analysis and Machine Intelligence, IEEE Transactions on, vol. 34, no. 7, pp. 1281-1298, 2012). However, it will be appreciated that in other embodiments alternative techniques could be used, including any feature detector or feature descriptor, e.g. SIFT feature descriptor and detector.

3D landmarks are calculated in the stereo frame and saved to $F_q$. Visual odometry operates on $F_q$ and $F_{q-1}$ to update the position estimate of the apparatus in the map. Attempts are made to match $F_q$ with candidate nodes Y in the graph. This last step can be performed in parallel by multiple CPU cores, where it is shown that the number of parallel processes $N_p=4$ and the number of matching rounds $N_r=2$. The requirement for on-line performance is shown as a dashed line. As shown, with $N_r=2$ the system would not be meeting its on-line performance criteria, and would have to reduce the number of localisation attempts by setting $N_r=1$. This results in fewer localisation attempts. It should be noted that the second core can be used for the additional processing work during experience creation in the example embodiment. Localisation performance could be improved by increasing the number of CPU cores $N_p$, or by increasing the number of matching rounds $N_r$, but this would require more expensive hardware, or a reduction in on-line performance, both of which may not be feasible. Instead, embodiments of the present invention can involve a technique for improving the ranking policy, r.

It will be understood that another localisation method could be used instead of visual odometry, provided that the relative transformation between the current pose of the apparatus and a node in the map can be obtained. The present inventors have devised "path memory" as a way to encode past use of the experience graph by the apparatus 200 (or another apparatus performing similar operations). Path memory is a collection of paths, where an individual path records the trajectory of the (same or another) apparatus through the experience graph on a particular outing. It is possible for multiple apparatuses to access the same experience graph data, e.g. with each apparatus adding new paths at the same time. This can allow one apparatus to learn from other apparatus's past experiences, as well as its own. A path implicitly links nodes that are representations of locations in the environment that were visited by the apparatus when creating the node data based on location representation data, e.g. images, captured (by the apparatus 200/associated sensor(s) 202) under similar conditions.

Figure 5:
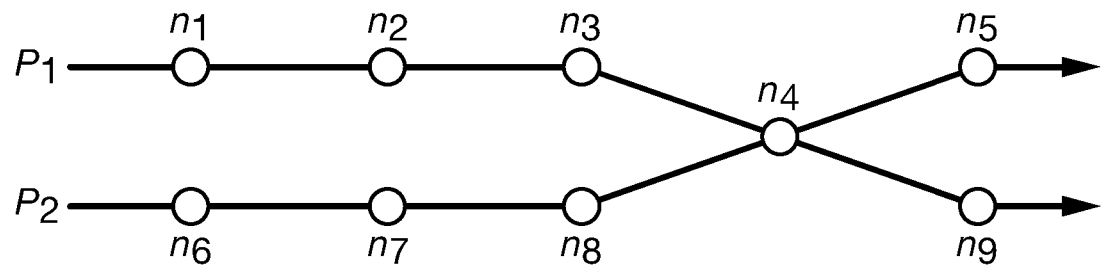
FIG. 5 schematically illustrate paths that connect nodes in the experience graph.

FIG. 5 illustrates two example paths. The first path $P_1$ may have been created on a sunny day and the second path $P_2$ on a rainy day. The two paths link different nodes, since the weather conditions force the apparatus to localise in either sunny or rainy experiences. From this it can be inferred that nodes $\{n_1; n_2; n_3; n_4; n_9\}$ represent a set of locations within the environment under similar conditions (e.g. afternoon sunshine), and $\{n_6; n_7; n_8; n_4; n_5\}$ represent the same/similar locations under a different set of environmental conditions (e.g. rain). The apparatus may localise in some nodes under both conditions, as shown by $n_4$. If the apparatus revisits the area for a third time and starts to localise to nodes on the sunny path, it can be inferred that the apparatus will probably localise to other sunny nodes in the near future too. So, without knowing anything about what caused the appearance change in the environment, the apparatus can automatically learn which nodes are more likely to result in a successful localisation.

The description above discussed metric edges containing transformations which gave the experience graph a relative structure. Here, the inventors introduce non-metric edges which do not contribute to the relative structure. A path $P_m$ of length k consists of a sequence of these non-metric edges, $P_m=[e_0; e_1; \ldots ; e_k]$, where an edge connects two nodes, $n_s$ and $n_t$ in the experience graph G.

Path creation can be done incrementally at run-time, after the localiser has finished processing. If the localiser returns a successful localisation matching the live frame $F_q$ to node $n_k$, which is different to the previously matched node $n_{k-1}$, the apparatus is said to have moved in experience space from $n_k$ to $n_{k-1}$. This triggers the creation of a new edge belonging to path $P_m$, between $n_{k-1}$ and $n_k$. The path memory is defined as a collection of these paths:

$$P=\{P_1, \ldots, P_{|P|}\}$$

where |P| is the number of paths recorded, and a single path $P_m$ represents the trajectory of the apparatus through the experience graph on a particular outing.

Figure 6:
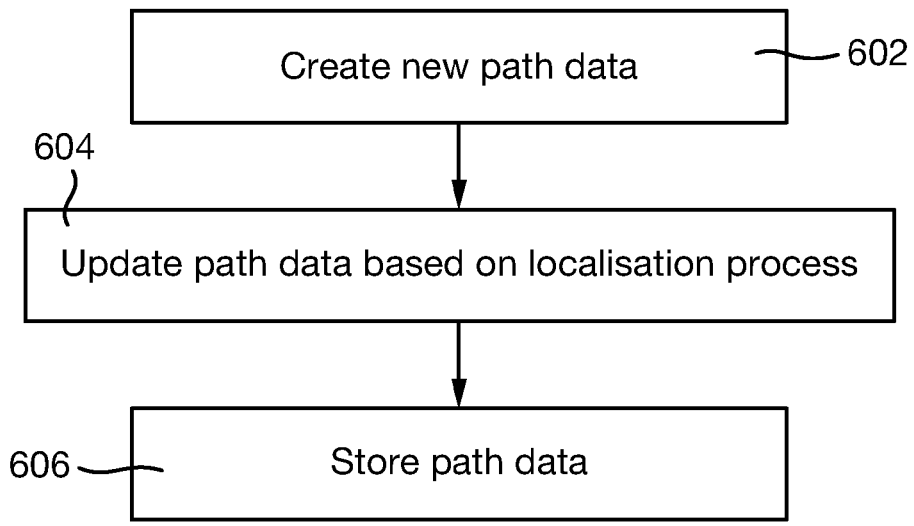
FIG. 6 is a flowchart showing steps involved in building a path memory.

FIG. 6 illustrates schematically steps that can be performed by the computing device 204 (or another suitable computing device that is in communication with the apparatus 200) to create path memory data. It will be appreciated that the steps of the flowcharts given herein are exemplary only and in alternative embodiments at least some of the steps may be re-ordered or omitted, and/or additional steps may be performed. It will also be understood that the processes can be implemented using any suitable hardware, software, programming languages and data structures. Also, various data can be stored in/retrieved from various storage means, which may be remote from the apparatus 200.

At step 602 the computing device 204 creates and initialises data relating to a new path, typically when the apparatus 200 starts a new outing; is switched on, or when a suitable "start new path" instruction is provided, etc. This step can involve, for example, obtaining at least part of an existing experience data set and establishing the current node based on the starting pose of the apparatus in the environment.

At step 604 the apparatus 200 moves within the environment and uses the camera(s) 202 to capture images (or other type of sensor(s)/location representation data in alternative embodiments). The computing device 204 attempts to localise the apparatus within the environment, e.g. using a localisation process as described below. If the result of this localisation process is that the captured image/location representation data is matched to a node that is different to the starting/previously matched node then the path data is updated to include an edge between the previous node and the new node. Step 604 can be repeated until the apparatus stops moving for a certain period of time; is switched off, or a suitable "end path" instruction is provided by a user, etc.

At step 606 the list of edges is stored as a path in a path memory data set for future use. It will be appreciated that path data could comprise different data to a list of edges, e.g. an ordered list of nodes, a set of coordinates that can be matched to locations within the environment/experience data set, etc.

Embodiments of the invention can leverage stored path memory data to intelligently select candidate nodes for localisation. In addition to recording path memory data, embodiments can also explicitly record a summary of the recent localisation attempts by the apparatus on the live run.

Figure 7:
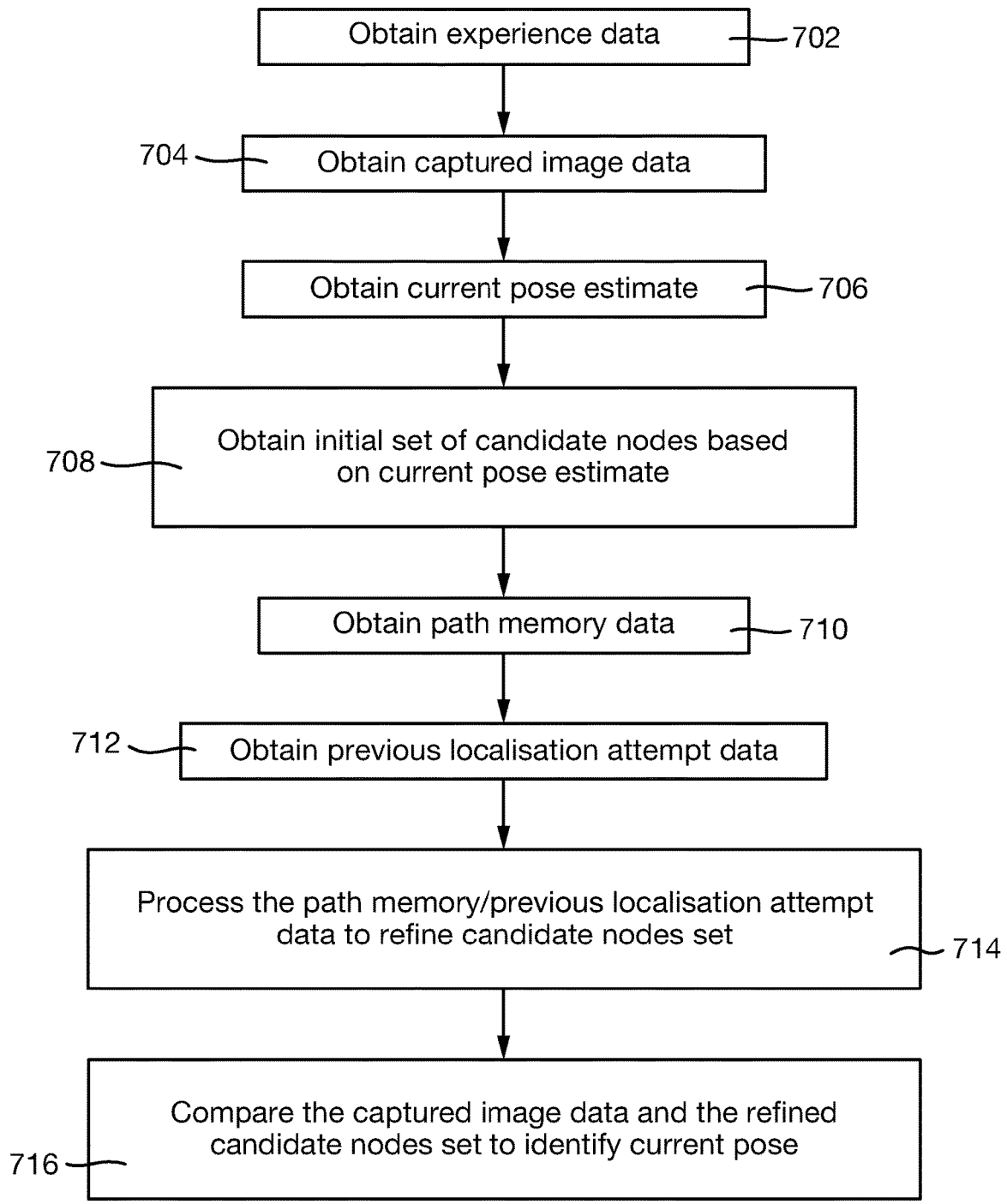
FIG. 7 is a flowchart showing steps involved in embodiments of the localisation process.

FIG. 7 illustrates schematically steps that can be performed by the computing device 204 (or another suitable computing device(s) in communication with the apparatus 200) to localise the apparatus in the environment.

At step 702 data representing at least part of an existing experience data set (as discussed above) for the environment can be obtained. Typically, the experience data is loaded during an initial iteration of the localisation process.

At step 704 captured image data based on live images captured by the camera(s) 202 (or other type of sensor(s)/location representation data in alternative embodiments) is obtained.

At step 706 a current pose estimate for the portable apparatus 200 is obtained, which will normally represent the pose of the apparatus at which the data of step 704 was captured. This estimate can be based on pose data provided provide by a previous iteration of the localisation process, or an initial pose estimate, which can be obtained in various ways, e.g. using a weak localiser such as GPS; a topological localizer, such as the known SeqSLAM technique, or even by starting from a known location, such as a garage.

At step 708 a set of candidate nodes from the experience data set is obtained, based on the current pose estimate.

Typically, nodes in the experience data that are neighbours of the node corresponding to the current pose estimate may be selected initially. Optionally, a ranking policy may be used to obtain the candidate nodes according to distance from the current pose estimate.

Embodiments of the localisation method may seek to refine the set of candidate nodes using path memory data. In general terms, the method can determine if the nodes traversed by the portable apparatus 200 during the current outing correspond to nodes of a stored path and if so, at least one relevant (e.g. the next one or more) node in one or more of the stored path(s) may be selected for inclusion in the refined set of candidate nodes.

At step 710 data from the path memory data is obtained. In some embodiments the path memory is queried for the number of paths connecting the node corresponding to the current pose estimate to each of the candidate nodes obtained at step 708. At least one node from the path(s) with the most connections between the current node and the candidate nodes can be selected.

Optionally, at step 712 data relating to previous localisation attempts is obtained. Data can be stored which indicates whether or not nodes have successfully matched in previous localisation attempts.

At step 714 the obtained path data and, optionally, the previous localisation attempt data, is processed in order to produce a refined set of candidate nodes. In a basic embodiment the number of nodes that are common between a particular path in the path memory and the recent localisation attempt data can be counted, with the node(s) corresponding to the highest count(s) being selection for inclusion in the refined set of candidate nodes. Another embodiment can, additionally or alternatively, produce the refined set of candidate nodes by assessing if the apparatus is currently localised in a node on a particular path in the path memory, and if so then nodes in that path are selected/prioritised for the localisation step. In alternative embodiments, the path data may also be used to generate a set of candidate nodes.

At step 716 the captured image data is compared with the refined set of candidate nodes in order to generate pose estimate, e.g. using the image matching techniques discussed above. Data relating to this pose estimate can be used to navigate the vehicle (e.g. using it as an input into a control system), displayed to an on-board or remote user, etc. In alternative embodiments, non-visual captured location representation data may be compared using a suitable technique with non-visual data representing the refined set of candidate nodes.

Specific embodiments, such as the ones that will be described below, can use a probabilistic framework which enables the apparatus to predict candidate nodes that are likely to localise successfully. Such embodiments can generate a probability distribution over the set of candidate nodes Y based on a set of conditionally independent observations. Embodiments can use the past localisation history of the apparatus as training data, and since this is stored implicitly in path memory P, the learning process is unsupervised.

Data representing nodes based on recent localisation attempts by the apparatus on the live run can be are recorded in W and the $j^{th}$ node in the set as $^j W$. The term "recent" can be defined by a parameter T, where T is the number of preceding iterations of the localiser to remember (the localiser can make several localisation attempts on one iteration).

Figure 8A:
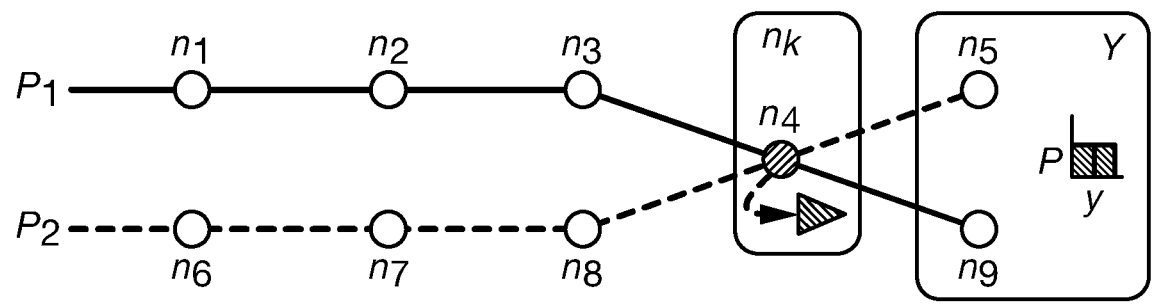
FIGS. 8(a) and 8(b) illustrate how path memory can be used to predict candidate nodes in the experience graph for improved localisation.
Figure 8B:
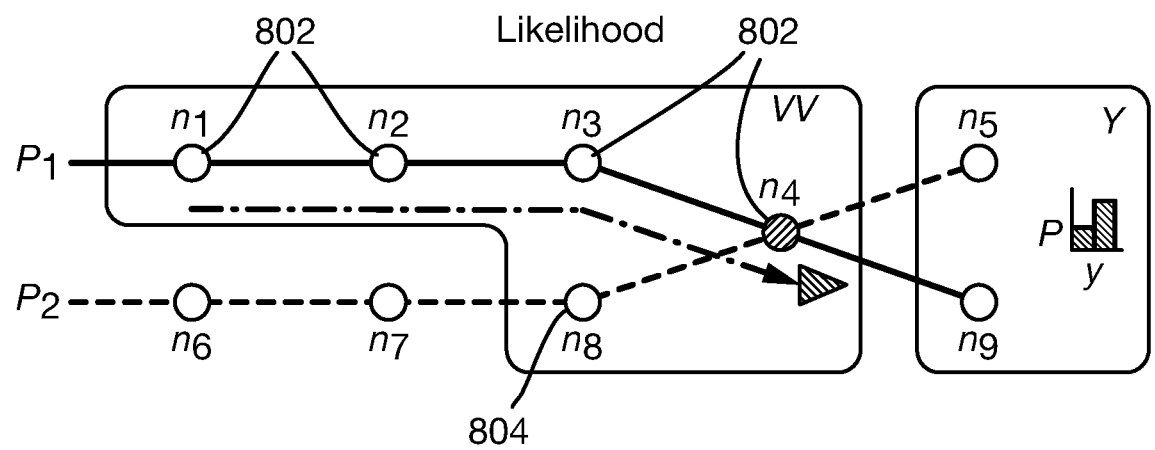

Examples of these nodes are shown in FIGS. 8(a)-(b), where W={$n_1$; $n_2$; $n_3$; $n_4$; $n_8$}. FIGS. 8(a)-8(b) illustrate how path memory can be leveraged to make predictions about which candidate nodes are most likely to result in a successful localisation. Nodes in the experience graph are labelled $n_1$; . . . ; $n_9$ and two paths from path memory are shown, $P_1$ and $P_2$. In the example, the set of candidate nodes are Y={$n_5$; $n_9$}.

In FIG. 8(a), which illustrates the prior, $n_k$ is the node the apparatus is currently localised against ($n_k$=$n_3$). The prior distribution over the candidate nodes is calculated based on the number of paths connecting $n_k$ and each node in Y. In FIG. 8(b), which illustrates the likelihood, the set of observation nodes W={$n_1$; $n_2$; $n_3$; $n_4$; $n_8$} are the nodes which the apparatus has recently tried to localise against (the trajectory of the apparatus is shown as a dot-dashed line). Each localisation attempt with nodes in W will have resulted in either a successful or failed stereo match. Nodes 802 denote successful localisation attempts, whereas nodes 804 denote failed localisation attempts. Success or failure is recorded in the binary observation vector Z=[$z_1$; . . . ; $z_{|W|}$]. The corresponding observation vector for the illustrated example is thus Z=[1; 1; 1; 1; 0].

A probability distribution over the candidate nodes Y is generated as shown, which is combined with the prior to make predictions about which candidate node is most likely to result in a successful localisation.

For each node in W, there exists a corresponding bit in Z such that:

$$z_j = \begin{cases} 1 & \text{if localisation with node } ^jW \text{ succeeded} \\ 0 & \text{if localisation with node } ^jW \text{ failed} \end{cases}$$

Lastly, the indicator variable is defined as y=(0; . . . ; 1; . . . ; $0)^T$ as a vector of length |Y|. One element takes the value 1 and all remaining elements are 0. y is defined as a discrete random variable describing which candidate node will localise successfully. p(y=i) is used to refer to the probability of successfully localising the live camera frame $F_q$ to the $i^{th}$ candidate node $^iY$.

Using Bayes Theorem, the probability distribution over y can be calculated as follows:

$$p(y \mid \mathcal{Z}, \theta, \pi) = \frac{1}{\beta} \underbrace{p(\mathcal{Z} \mid y, \theta)}_{likelihood} \underbrace{p(y, \pi)}_{prior} \qquad (1)$$

where θ is a |Y|×|W| matrix describing p(Z|y), α is a 1×|Y| vector describing p(y), and β is a normalisation constant. Since it is only necessary to rank the candidate nodes by their corresponding p(y=i|Z, θ, π), it is not necessary to explicitly calculate β.

The likelihood and prior terms will be discussed separately below, before presenting the system as a whole again.

Intuitively, the following is to be captured: in path memory, if many paths connect node $^jW$ and node $^iY$, it means $^jW$ and $^iY$ must represent the world under similar conditions (e.g. early morning sunshine). At run-time, if the apparatus localises in $^jW$, path memory would suggest that we are also likely to localise in $^iY$. For example, in FIG. 8(b) if the apparatus has localised to $n_3$, it would normally also be expected to localise to $n_9$ as it is connected by a path. Each binary element in Z represents an observation, and each observation corresponds to a node in W, which either succeeded ($z_i$=1) or failed to localise ($z_i$=0). An assumption is made that all localisation attempts in Z are conditionally independent, given that it is known which candidate node $^iY$ will localise successfully. This is a simplification of reality, since the probability of localising to a node on a path is affected by the success or failure of all neighbouring localisation attempts. The likelihood term for a particular candidate node $^iY$ is expressed as:

$$p(\mathcal{Z} \mid y = i) \propto \prod_{j=1}^{|W|} p(z_j \mid y = i). \quad (2)$$

Previously, θ was introduced as a $|Y| \times |W|$ matrix. A single element $\theta_{i,j}$ is defined as:

$$\theta_{i,j} = p(z_j \mid y = i) \quad (3)$$

the $i^{th}$ row in θ is referred to as $\theta_i$, which corresponds to $p(Z|y=i)$.

Each observation in $z_j$ is treated as a single Bernoulli experiment parameterised by $\theta_{i,j}$. These parameters are learnt from path memory:

$$\theta_{i,j} \propto \underbrace{p(y = i \mid z_j)}_{\text{Binomial distribution}} \underbrace{p(z_j)}_{\text{Beta distribution}}$$

where $\theta_i$ is normalised such that $$\sum_{j=1}^{|W|} \theta_{i,j} = 1. \quad (4)$$

Since the Beta distribution is the conjugate prior to the Binomial distribution, the posterior is also a Beta distribution. $\theta_{i,j}$ can be calculated using the expectation of the resulting Beta distribution:

$$\theta_{i,j} = \frac{Z_{i,j} + \alpha_j}{\sum_{x=1}^{|W|} (Z_{i,x} + \alpha_x)} \quad (5)$$

where $Z_{i,j}$ is the number of times a path links $^jW$ and $^iY$ in path memory, and the parameter $\alpha_j$ specifies the prior Beta distribution. The inventors set $\alpha_j = 1$ to represent the probability that in the absence of path memory, all observations are equally likely. This can be thought of as adding "pseudo-counts" to the results from the binomial experiment in order to prevent the "zero count problem" which can occur in sparse training sets.

The likelihood term can be thought of as the probability of the apparatus's live trajectory generating the observation vector Z, given that a particular candidate node localises successfully. In the example of FIG. 8(b), the observation vector $Z=[1, 1, 1, 1, 0]$ is considered unlikely if $n_5$ were to localise successfully. However, the observation vector Z would be likely if $n_9$ localised successfully, since this corresponds with the knowledge in the path memory. Thus, the likelihood term is calculated as:

$$p(\mathcal{Z} \mid y = i) \propto \prod_{j=1}^{n} \theta_{i,j}^{\mathbb{I}(z_j=1)} (1 - \theta_{i,j})^{\mathbb{I}(z_j=0)} \quad (6)$$

where $I(x=a)$ is an indicator function, such that $$\mathbb{I}(x = a) = \begin{cases} 1 & \text{if } x = a \\ 0 & \text{otherwise} \end{cases}$$

The prior models initial belief in the probability distribution over Y, in the absence of the observation vector Z. The prior is calculated by querying path memory P for the number of paths connecting the node $n_k$ in which the apparatus is currently localised, to each candidate node in Y. The prior is biased towards candidate nodes with many paths connecting $n_k$ and $^iY$. An example of this is shown in FIG. 8(a), where paths connect $n_k$ and the candidate nodes $Y=\{n_5; n_9\}$. The parameter vector π is used to model the probability distribution over Y, where $\pi_i$ is the probability that candidate node $^iY$ will localise successfully. π is modelled as:

$$\pi = \underbrace{p(n_k \mid y)}_{\text{Multinomial distribution}} \underbrace{p(y)}_{\text{Dirichlet distribution}} \quad (7)$$

where $p(n_k|y)$ is a multinomial distribution and $p(y)$ is a Dirichlet distribution parameterised by the parameter vector γ. Since the Dirichlet distribution is the conjugate prior to the multinomial distribution, the posterior distribution is also a Dirichlet distribution. Each element in 7 is calculated using the Dirichlet expectation for the corresponding $i^{th}$ candidate node:

$$\pi_i = \frac{N_{i,k} + \gamma_i}{\sum_{x=1}^{|Y|} (N_x + \gamma_x)} \quad (8)$$

where $N_{i,k}$ is the number of paths in path memory connecting $n_k$ and $^iY$. The inventors set $i=1$ to represent a uniform distribution over the candidate nodes in the absence of path memory.

The above discussion introduced the system's output as a probability distribution over the set of candidate nodes Y in Equation 1. It shows that this can be achieved by simple event counting (Equations 5, 6 and 8), where events are stored implicitly in path memory. This enables the apparatus to learn from its past localisation history and make robust yet computationally inexpensive predictions. The probability distribution over the candidate nodes Y is calculated using the equations for the likelihood (Equation 6) and prior (Equation 8):

$$p(y = i \mid \mathcal{Z}, \theta_i, \pi) \propto \pi_i \prod_{j=1}^{n} \theta_{i,j}^{\mathbb{I}(z_j=1)} (1 - \theta_{i,j})^{\mathbb{I}(z_j=0)} \quad (9)$$

The set of candidate nodes Y is ranked by the probability distribution over Y so that relevant nodes are prioritised over nodes unlikely to obtain a localisation.

Embodiments of the system were evaluated on three challenging outdoor datasets, covering a total of 206 km. FIGS. 9(a)-9(c) compare the ranking policies r(path) and r(distance) for the three datasets. The graphs show the probability of travelling further than 10 m without a successful localisation in the experience graph as a function of the number of CPU cores available during localisation. During periods of localisation failure, the apparatus must proceed in open-loop on visual odometry, which accumulates drift in the position estimate. After travelling 10 m without a successful localisation, the apparatus begins a re-localisation procedure using the known FAB-MAP technique.

From FIG. 9, it is clear that for both ranking policies, localisation failures reduce as the number of cores are increased, converging on the best possible localisation performance given infinite resources. This is because a greater number of localisation attempts can be made in a single iteration, resulting in a statistically higher chance of choosing the right node. However, r(path) clearly outperforms r(distance) when the number of CPU cores is fixed to a small number. In terms of efficiency, r (path) results in approximately the same localisation performance as r (distance), but uses only half the number of CPU cores.

Of the three datasets, the dataset of FIG. 9(a) showed the biggest improvement using r (path), reducing localisation perform by a factor of 5 for number of cores Np=2. This is attributed to the large amount of training data available. It is noted that the FIG. 9(c) dataset's performance with r (path) and r (distance) converges at approximately six CPU cores, fewer than the other two datasets. This is because the FIG. 9(c) dataset does not include as much training data (repeat traverses through the same area) as the other datasets, resulting in reduced experience density. Over time, experience density would certainly increase and require more CPU cores to obtain the optimal performance with r (distance).

Figure 10:
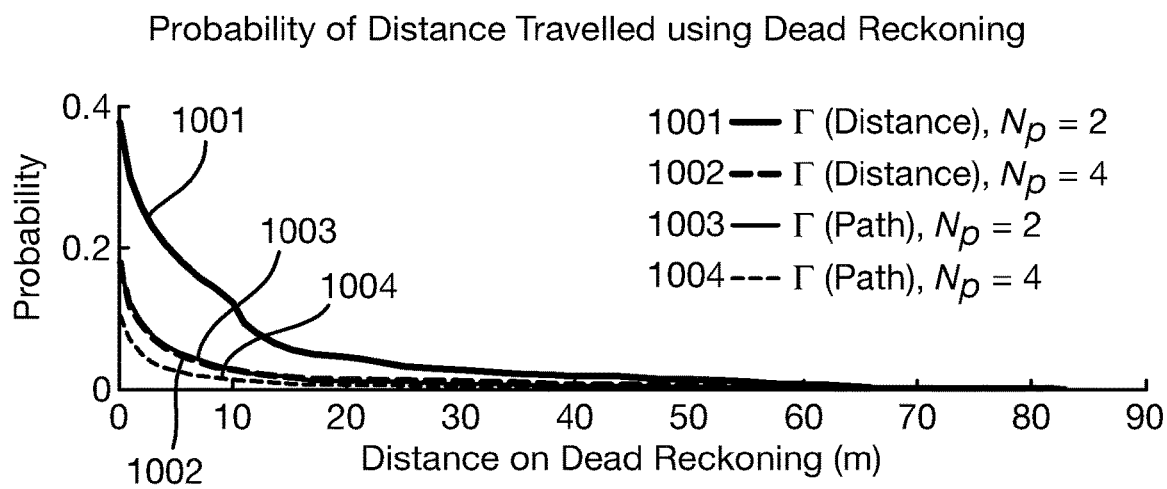
FIG. 10 is another graph relating to the experiment.

FIG. 10 uses the dataset of FIG. 9(a) to present the probability of travelling a certain distance without a successful localisation. The graph shows that r(path) and number of CPU cores Np=2 provides nearly identical performance to r(distance) and Np=4, showing that the same performance is obtained while performing half the computation work.

The inventors monitored the computational cost of implementing r(path) by observing the processing time on a 2.3 GHz Intel Core i7 processor. It was found that processing times never exceeded 0.5 ms. This is a negligible portion of the processing time required to perform a single localisation attempt.

It is noted that while r(path) outperforms r(distance) in every test, r(distance) still performs reasonably well considering it operates on very limited information. This is because the point features used by visual odometry during localisation have limited invariance to translation, so nodes that are closer to the apparatus are more likely to result in successful feature correspondences and consequently in successful localisation. However, this approach scales poorly with experience-density, requiring more CPU cores to process greater numbers of candidate nodes for reliable localisation.

Figure 11:
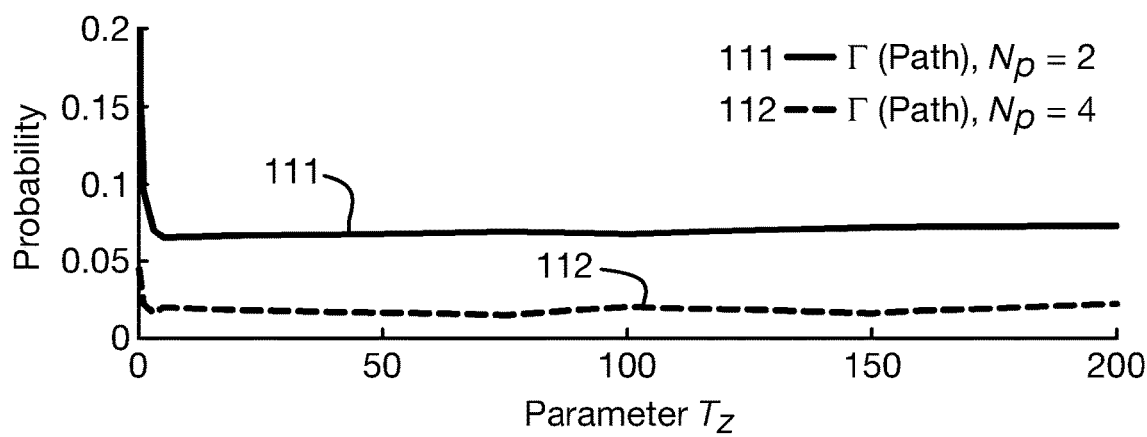
FIG. 11 is a further graph relating to the experiment.

Parameter T controls the number of preceding localisation iterations to remember when generating the summary of recent localisation attempts W and corresponding observation vector Z (see Section V). FIG. 11 shows that between T=5 and T=200, localisation failure increases very slightly with T, a result of observations close to the apparatus being more relevant than those further away. However, this effect is minimal and for 5>T>200 the localisation performance is not sensitive to the parameter T.

For T=0 the performance decreases significantly. This is because the likelihood term is not used when T=0 and the candidate nodes are predicted solely using the prior distribution. This justifies the use of the likelihood term, as discussed above.

Embodiments of the system described herein can provide life-long, vast-scale localisation in challenging outdoor conditions. The inventors have demonstrated how the prioritised recollection of relevant experiences is crucial for apparatus with finite resources and a limited amount of time for processing. An informed ranking policy that exploits knowledge of the apparatus's past use of the experience-map can reduce localisation failure by as much as a factor of 5 for robots with a limit on the number of CPU cores and processing time for localisation. Even in the case of sparse training data, the system still outperforms the baseline ranking policy based on distance. From an efficiency point-of-view, embodiments can maintain localisation performance while using half the number of CPU cores as previously. The computational cost of implementing embodiments of the system is minimal and the performance gains substantial.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of localizing a portable apparatus in an environment, the method comprising:
   obtaining a stored experience data set comprising a set of connected nodes, each said node comprising a representation of a location within the environment;
   obtaining captured location representation data provided by at least one sensor associated with the portable apparatus;
   obtaining a current pose estimate of the portable apparatus within the environment;
   using the current pose estimate to select a candidate set of the nodes from the stored experience data set that contain a potential match for the captured location representation data;
   using the current pose estimate to obtain a set of paths from path memory data, each said path comprising a set of said nodes previously traversed in the environment under similar environmental/visual conditions;
   using the set of paths to refine the candidate set of nodes;
   comparing the captured location representation data and the refined candidate set of nodes in order to identify a current pose of the portable apparatus within the environment; and
   navigating the portable apparatus using at least the current pose of the portable apparatus.

2. The method according to claim 1, wherein using the set of paths to refine the candidate set of nodes comprises:
   assessing if the current pose estimate corresponds to a said node in a said path in the set of paths; and
   if a result of the assessing is positive then selecting the corresponding node in that path for inclusion in the refined set of candidate nodes.

3. The method according to claim 1, wherein using the set of paths to refine the candidate set of nodes comprises:
   determining if the nodes traversed by the portable apparatus prior to the node corresponding to the current pose estimate correspond to said nodes in a said path in the set of paths; and
   if a result of the determination is positive then selecting at least one neighboring said node in the path for inclusion in the refined candidate set.

4. The method according to claim 1, wherein using the current pose estimate to select the candidate set of nodes comprises selecting an initial set of candidate nodes from the stored experience data set that are neighbors of the current pose estimate.

5. The method according to claim 4, wherein the selecting of the initial set of nodes comprises ranking the neighboring nodes according to distance from the current pose estimate.

6. The method according to claim 1, wherein using the set of paths to refine the candidate set of nodes comprises:
   counting a number of said paths in the set of paths that connect a node corresponding to the current pose estimate with each said node in the candidate set; and
   selecting the nodes for retention in the refined candidate set based on a result of the counting.

7. The method according to claim 6, wherein the nodes that neighbor the node corresponding to the current pose estimate in the path(s) having highest a said count are retained in the refined candidate set.

8. The method according to claim 1, wherein the method further comprises:
   obtaining previous localization data which indicates whether or not at least some of the nodes in the candidate set were processed in a previous localization attempt; and
   using the previous localization data to produce the refined set of candidate nodes.

9. The method according to claim 8, wherein using the previous localization data to produce the refined set of candidate nodes comprises:
   counting a number of nodes common between a said path in the path memory and the previous localization data; and
   selecting the node(s) corresponding to a highest said count(s) for inclusion in the refined set of candidate nodes.

10. The method according to claim 9, wherein a probability distribution relating to the previous localization data is used to produce the refined set of candidate nodes.

11. The method according to claim 1, wherein the captured location representation data comprises at least one visual image.

12. A device adapted to localize a portable apparatus in an environment, the device comprising:
    one or more components configured to
      obtain a stored experience data set comprising a set of connected nodes, each said node comprising a representation of a location within the environment;
      obtain captured location representation data provided by at least one sensor associated with the portable apparatus;
      obtain a current pose estimate of the portable apparatus within the environment;
      use the current pose estimate to select a candidate set of the nodes from the stored experience data set that contain a potential match for the captured location representation data;
      use the current pose estimate to obtain a set of paths from path memory data, each said path comprising a set of said nodes previously traversed in the environment under similar environmental/visual conditions;
      use the set of paths to refine the candidate set of nodes;
      compare the captured location representation data and the refined candidate set of nodes in order to identify a current pose of the portable apparatus within the environment; and
      navigate the portable apparatus using at least the current pose of the portable apparatus.

13. The device according to claim 12, wherein the one or more components configured to compare the captured location representation data comprises a plurality of processors configured to operate in parallel, each said processor configured to compare the captured location representation data with a particular one of the nodes in the refined candidate.

14. A vehicle including the device according to claim 12.

15. One or more non-transitory computer readable mediums storing a computer program that when executed by one or more processors cause a process to the carried out for localizing a portable apparatus in an environment, the process comprising:
    obtaining a stored experience data set comprising a set of connected nodes, each said node comprising a representation of a location within the environment;
    obtaining captured location representation data provided by at least one sensor associated with the portable apparatus;

obtaining a current pose estimate of the portable apparatus within the environment;

using the current pose estimate to select a candidate set of the nodes from the stored experience data set that contain a potential match for the captured location representation data;

using the current pose estimate to obtain a set of paths from path memory data, each said path comprising a set of said nodes previously traversed in the environment under similar environmental/visual conditions;

using the set of paths to refine the candidate set of nodes;

comparing the captured location representation data and the refined candidate set of nodes in order to identify a current pose of the portable apparatus within the environment; and navigating the portable apparatus using at least the current pose of the portable apparatus.

16. The one or more non-transitory computer readable mediums according to claim 15, wherein using the set of paths to refine the candidate set of nodes comprises:

assessing if the current pose estimate corresponds to a said node in a said path in the set of paths; and if a result of the assessing is positive then selecting the corresponding node in that path for inclusion in the refined set of candidate nodes.

17. The one or more non-transitory computer readable mediums according to claim 15, wherein using the set of paths to refine the candidate set of nodes comprises:

determining if the nodes traversed by the portable apparatus prior to the node corresponding to the current pose estimate correspond to said nodes in a said path in the set of paths; and if a result of the determination is positive then selecting at least one neighboring said node in the path for inclusion in the refined candidate set.

18. The one or more non-transitory computer readable mediums according to claim 15, wherein using the current pose estimate to select the candidate set of nodes comprises selecting an initial set of candidate nodes from the stored experience data set that are neighbors of the current pose estimate.

19. The one or more non-transitory computer readable mediums according to claim 15, wherein using the set of paths to refine the candidate set of nodes comprises:

counting a number of said paths in the set of paths that connect a node corresponding to the current pose estimate with each said node in the candidate set; and selecting the nodes for retention in the refined candidate set based on a result of the counting.

20. The one or more non-transitory computer readable mediums according to claim 15, the process further comprising:

obtaining previous localization data which indicates whether or not at least some of the nodes in the candidate set were processed in a previous localization attempt; and using the previous localization data to produce the refined set of candidate nodes.

* * * * *